United States Patent
Hashimoto et al.

(10) Patent No.: US 7,843,172 B2
(45) Date of Patent: Nov. 30, 2010

(54) BATTERY CHARGING CONTROLLER AND PORTABLE ELECTRONIC DEVICE

(75) Inventors: Tetsuro Hashimoto, Kyoto (JP); Isao Yamamoto, Kyoto (JP); Yoshikazu Sasaki, Kyoto (JP)

(73) Assignee: ROHM Co., Ltd. (JP)

( * ) Notice: Subject to any disclaimer, the term of this patent is extended or adjusted under 35 U.S.C. 154(b) by 748 days.

(21) Appl. No.: 11/805,908

(22) Filed: May 25, 2007

(65) Prior Publication Data

US 2008/0001574 A1    Jan. 3, 2008

(30) Foreign Application Priority Data

May 26, 2006    (JP)   .......................... P2006-147351

(51) Int. Cl.
*H02J 7/04* (2006.01)
*H02J 7/02* (2006.01)

(52) U.S. Cl. .................. 320/155; 320/111; 320/133
(58) Field of Classification Search ............... 320/114, 320/155
See application file for complete search history.

(56) References Cited

U.S. PATENT DOCUMENTS

| 5,777,399 A | * | 7/1998 | Shibuya ........................ 307/66 |
| 5,986,437 A | * | 11/1999 | Lee ............................. 320/162 |
| 6,657,415 B2 | * | 12/2003 | Saeki et al. .................. 320/125 |

FOREIGN PATENT DOCUMENTS

JP              6-133471          5/1994

* cited by examiner

*Primary Examiner*—Edward Tso
*Assistant Examiner*—Johali A Torres Ruiz
(74) *Attorney, Agent, or Firm*—Cantor Colburn LLP

(57) ABSTRACT

A battery charging controller according to the present invention controls battery charging in response to a charging-control signal sent from a CPU, and includes an starting controller which is started upon a detection of an insertion of an AC adapter, and which then starts a regulator at a predetermined timing by using a regulator control signal. The regulator is started upon a detection of the regulator control signal, and thereafter starts the CPU by using an starting signal. The CPU is started upon a detection of the starting signal.

12 Claims, 5 Drawing Sheets

BATTERY CHARGING CONTROLLER AND PORTABLE ELECTRONIC DEVICE

CROSS REFERENCE TO RELATED APPLICATION

This application is based upon and claims the benefit of priority from prior Japanese Patent Application P2006-147351 filed on May 26, 2006; the entire contents of which are incorporated by reference herein.

BACKGROUND OF THE INVENTION

1. Field of the Invention

The present invention relates to a battery charging controller and a portable electronic device which are configured to control battery charging in response to a charging-control signal sent from a CPU.

2. Description of the Related Art

A battery charging control LSI (a battery charging controller) has been known, which is configured to control battery charging in response to a charging-control signal sent from a central processing unit (CPU). By referring to FIGS. 1 and 2, an example of such a battery charging control LSI is described.

As shown in FIG. 1, a charging circuit 11 and a regulator 12 are provided to such a battery charging control LSI 4.

The charging circuit 11 is configured to be started upon detection of an insertion of an alternating current (AC) adapter (an application of an AC adapter voltage $V_{AC}$), and then to send an adapter detection signal (an interrupt signal) for informing a CPU 1 of the detection of the insertion of the AC adapter.

Moreover, the charging circuit 11 is configured to switch on and off the AC adapter voltage $V_{AC}$ applied to a battery 2 by making an ON/OFF control of a pMOS transistor switch, in response to a charging-control signal sent from the CPU 1.

The regulator 12 is configured to be started upon detection of an insertion of the battery 2 (an application of a battery voltage $V_{BAT}$), and then to start the CPU 1 by using an starting signal.

The CPU 1 is configured to be started upon detection of the starting signal sent from the regulator 12 (an application of a regulator voltage $V_{REG}$).

Moreover, the CPU 1 is configured to be started upon detection of the above starting signal, and then to generate the above-described charging-control signal in response to the adapter detection signal sent from the charging circuit 11. Thereafter, the CPU 1 sends the thus generated signal to the charging circuit 11.

By referring to FIG. 2, descriptions will be provided for operations for controlling battery charging in a portable electronic device provided with a battery charging control LSI 4 as the one described above.

As shown in FIG. 2, when the regulator 12 detects the battery voltage $V_{BAT}$ in Step S201, i.e., when an insertion of the battery 2 is detected, the regulator 12 is started in Step S202.

In Step S203, the regulator 12 starts the CPU 1 by using an starting signal.

Thereafter, when the charging circuit 11 detects an application of the AC adaptor voltage $V_{AC}$ in Step S204, i.e., when the insertion of the AC adapter is detected, the charging circuit 11 is started, and then sends, as an interrupt signal, an adaptor detection signal to the CPU 1, for informing the CPU 1 of an insertion of the AC adaptor.

When the CPU 1 detects, in Step S205, the adapter detection signal sent from the charging circuit 11, the CPU 1 generates, in Step S206, the above-described charging-control signal in response to the adaptor detection signal, and then sends the thus generated signal to the charging circuit 11.

Thereafter, the charging circuit 11 controls the charging of the battery 2 by making an ON/OFF control on the pMOS transistor switch in response to the charging-control signal received from the CPU 1.

However, in a case of the conventional battery charging control LSI 4, even when power is off and the AC adaptor is not inserted, the regulator 12 constantly operates by using the battery voltage $V_{BAT}$ and the CPU 1 also operates by using the regulator voltage, after the battery 2 is inserted. This state of the battery 2 produces a problem that the increased power consumption of the battery 2 shortens the battery duration.

SUMMARY OF THE INVENTION

The present invention has been made in view of the above-described problem, and an object thereof is to provide a battery charging controller and a portable electronic device which extend battery duration by saving power consumption of the battery at the time of controlling battery charging in response to a charging-control signal sent from a CPU.

A first feature of the present invention is a battery charging controller configured to control battery charging in response to a charging-control signal sent from a CPU. The battery charging controller includes an starting controller configured to be started upon detection of an insertion of an AC adapter, and then to start regulators each at a predetermined timing by using a regulator control signals. Each regulator is configured to be started upon detection of the corresponding regulator control signal, and then to start the CPU by using an starting signal. The CPU is configured to be started upon detection of the starting signal.

According to the above-described invention, the regulators are configured to be sequentially started after the insertion of the AC adapter is detected, not when the insertion of the battery is detected. Thus, the battery duration can be extended by saving power consumption of the battery.

In the first feature of the present invention, the battery charging controller may be provided with a charging circuit configured to send an adapter detection signal to the CPU for informing the CPU that the AC adapter is inserted, and then to perform the switching of whether to apply the AC adapter voltage to the battery in response to a charging-control signal sent from the CPU.

In the first feature of the present invention, the starting controller may be configured to send a reset signal to the CPU after predetermined time elapses from the starting of the regulator. Moreover, the CPU may be configured to generate the charging-control signal in response to the reset signal and the adapter detection signal, and then to send the thus generated charging-control signal.

According to the present invention, since the starting controller is configured to send a reset signal to the CPU after predetermined time elapses from the starting of the regulator, it is possible to avoid a situation where the reset signal is sent to the CPU before properly completing the starting of the CPU.

A second feature of the present invention is a portable electronic device with which a battery is charged by using the above-described battery charging controller.

As described above, according to the present invention, it is possible to provide a battery charging controller and a portable electronic device which extends battery duration by saving power consumption of the battery at the time of controlling battery charging in response to a charging-control signal sent from a CPU.

DETAILED DESCRIPTION OF THE INVENTION

Various embodiments of the present invention will be described with reference to the accompanying drawings. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail.

(Configuration of Portable Electronic Device)

Figure 1:
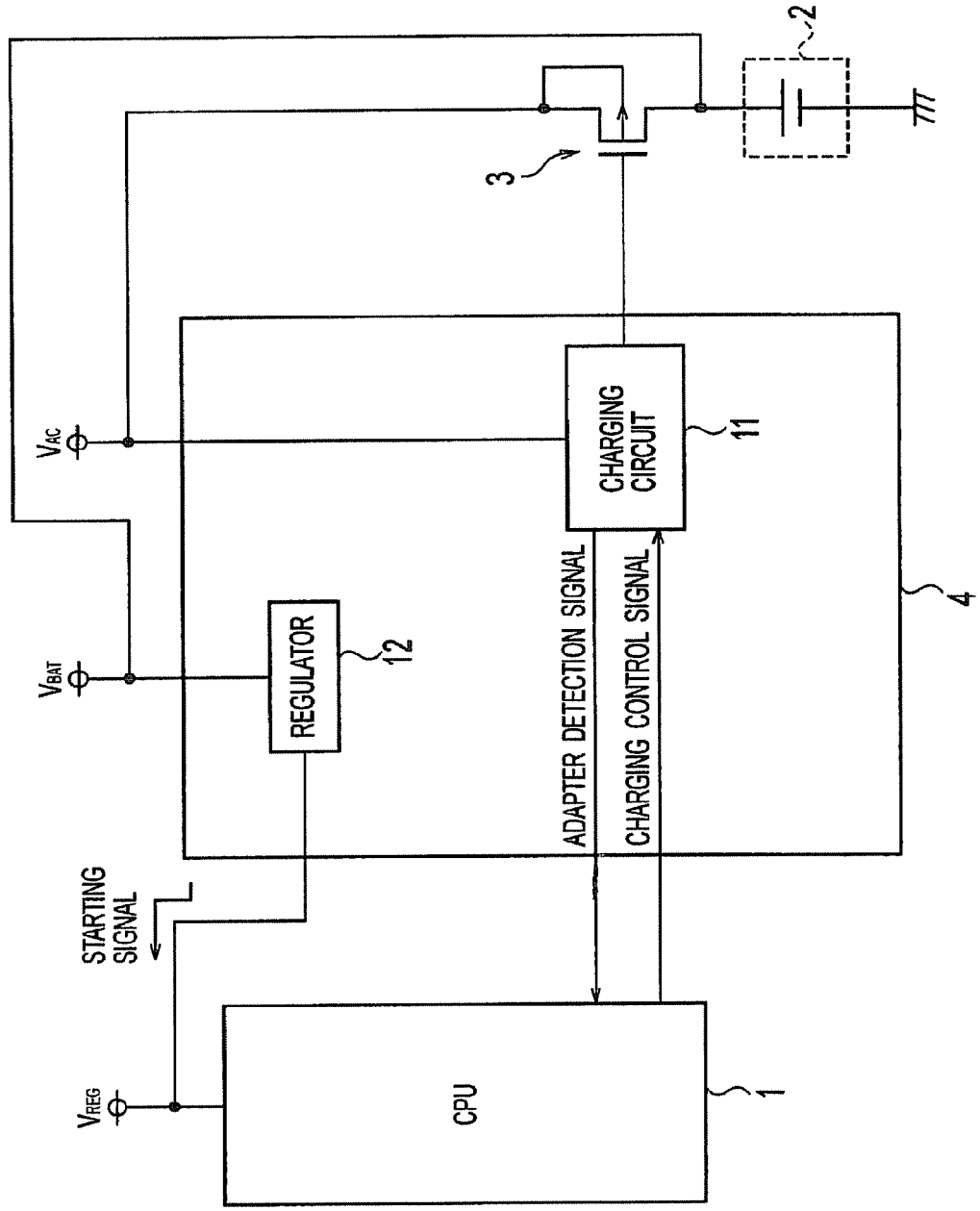
FIG. 1 is a view showing a configuration of a portable electronic device provided with a conventional battery charging control LSI.
Figure 2:
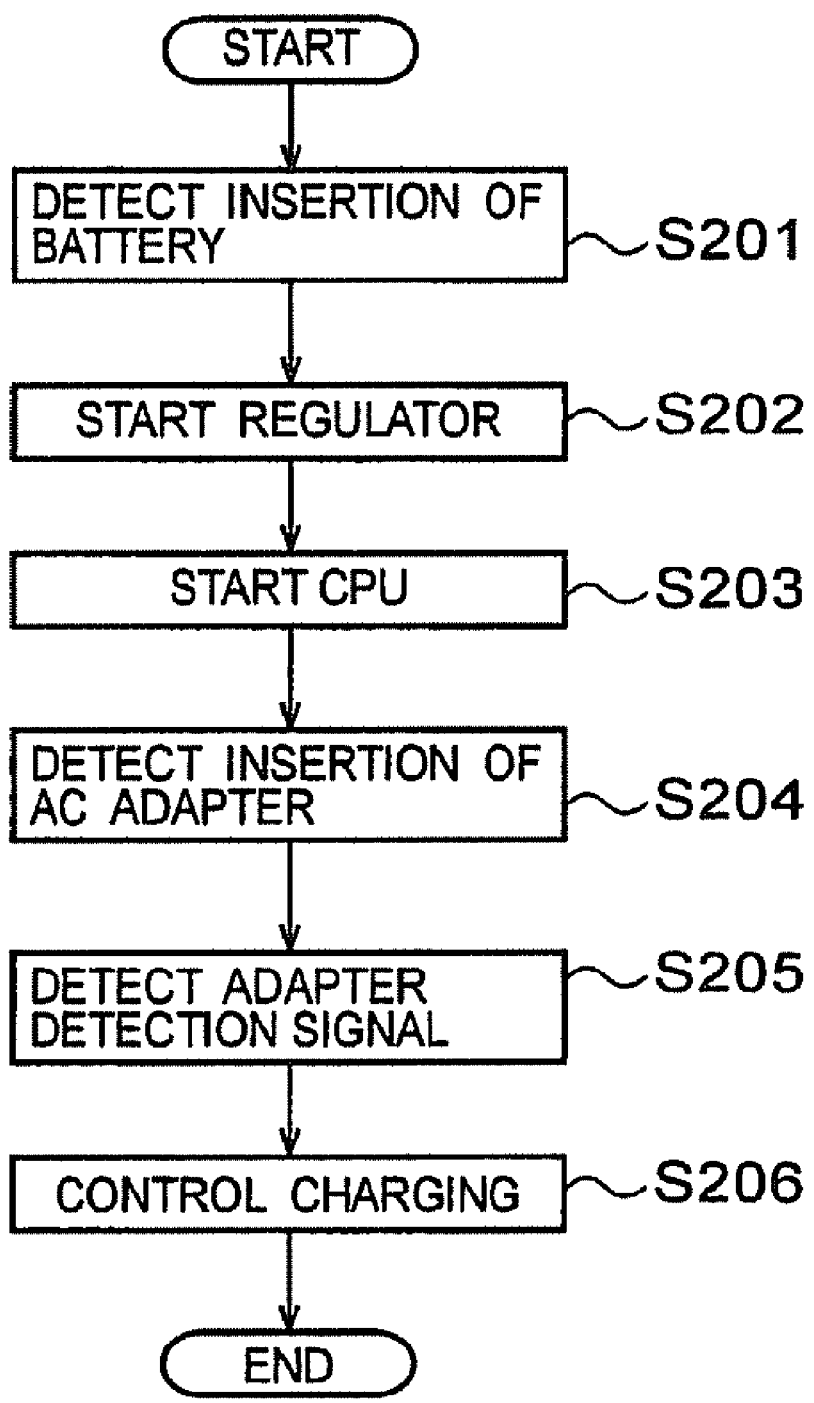
FIG. 2 is a flowchart showing operations for controlling battery charging of the portable electronic device provided with the conventional battery charging control LSI.
Figure 3:
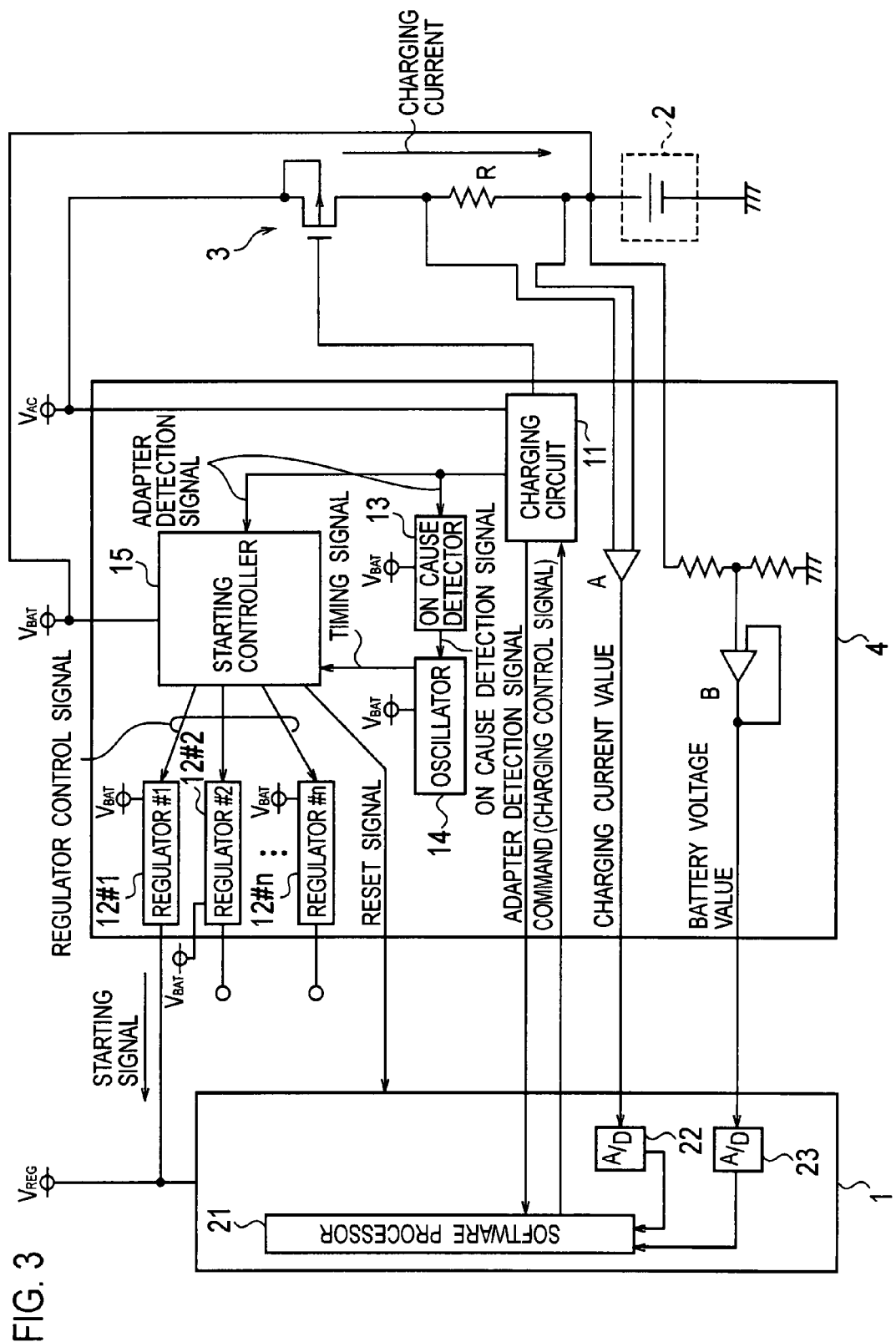
FIG. 3 is a view showing a configuration of a portable electronic device provided with a battery charging control LSI according to an embodiment of the present invention.

By referring to FIG. 3, descriptions will be provided for a configuration of a portable electronic device provided with a battery charging controller according to a first embodiment of the present invention. In an example of FIG. 3, a constitution is described, in which a battery charging control LSI 4 is provided as the battery charging controller.

The portable electronic device according to the present embodiment is configured to charge a battery 2 by using the battery charging control LSI 14 configured to control charging of the battery 2 in response to a charging-control signal sent from a CPU 1.

As such a portable electronic device, a portable communication terminal, a laptop computer, a portable music player, a portable video game machine or the like, is considered.

As shown in FIG. 3, a charging circuit 11, a plurality of regulators 12#1 to 12#n, an ON cause detector 13, an oscillator 14 and an starting controller 15 are provided to the battery charging control LSI 4.

Figure 4:
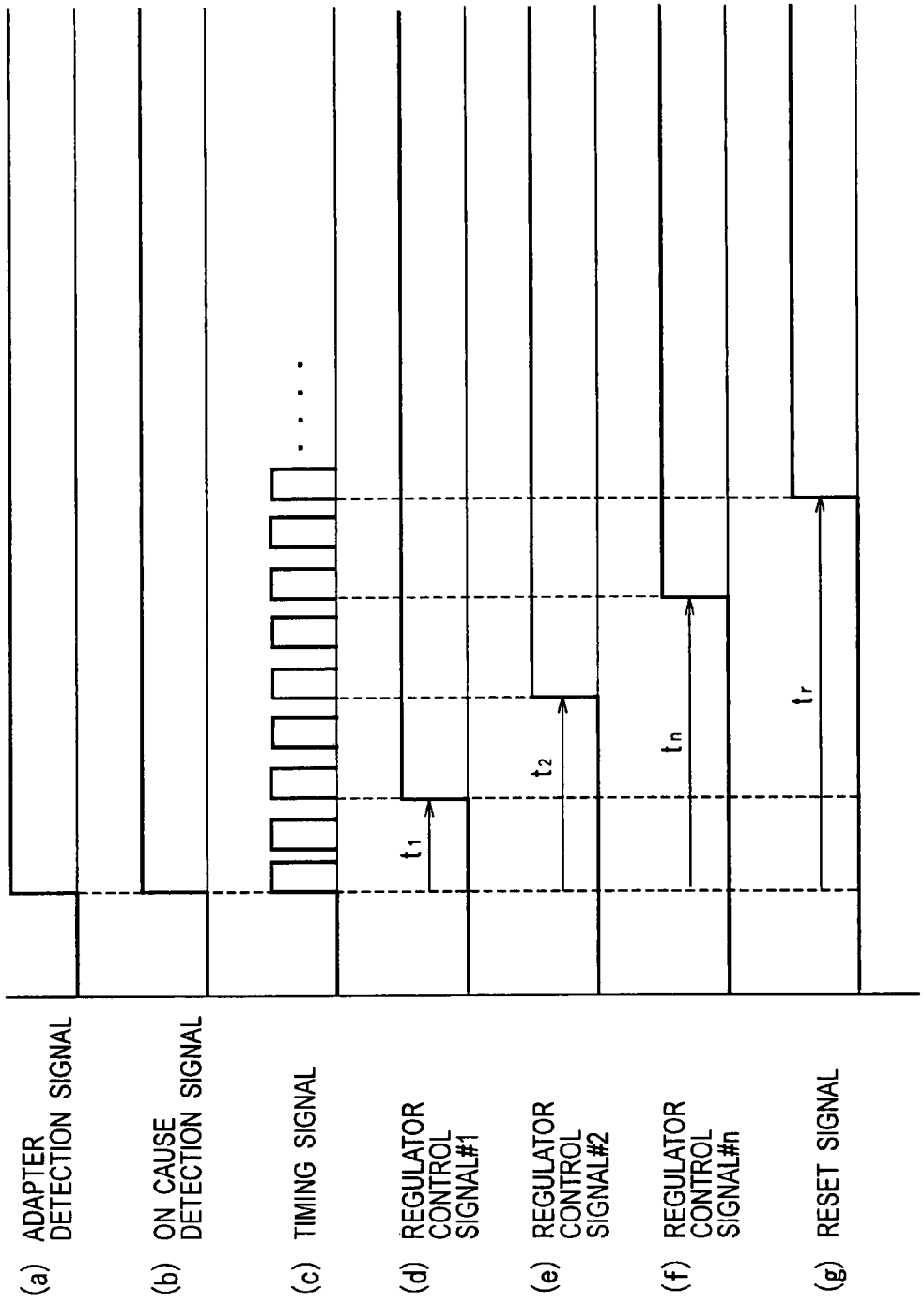
FIG. 4 is a sequence diagram showing timings of occurrences of signals in the portable electronic device provided with a battery charging control LSI according to an embodiment of the present invention.

The charging circuit 11 is configured to send an adapter detection signal to each of the CPU 1, the ON cause detector 13 and the starting controller 15, for informing the CPU 1, the ON cause detector 13 and the starting controller 15 of a detection of an insertion of an AC adapter (an application of an AC voltage $V_{AC}$). Reference symbol (a) of FIG. 4 shows a timing of an occurrence of the adapter detection signal.

To be more precise, the charging circuit 11 is configured to determine whether or not the applied AC adaptor voltage $V_{AC}$ is in a normal voltage range, and to send the adapter detection signal in a case where a result of the determination is positive.

Moreover, the charging circuit 11 is configured to perform the switching of whether to apply the AC adapter voltage $V_{AC}$ to the battery 2, in response to a charging-control signal sent from the CPU 1.

The ON cause detector 13 is configured to be started upon detection of the adapter detection signal, and then to detect causes for starting the regulators 12#1 to 12#n.

To be more precise, the ON cause detector 13 is configured to detect one of the above causes, which is "the fact that the AC adapter is inserted," by detecting the adapter detection signal sent from the charging circuit 11.

The ON cause detector 13 is configured to send an ON cause detection signal to an oscillator 14, upon detection of the above cause. Reference symbol (b) of FIG. 4 shows a timing of an occurrence of such an ON cause detection signal.

The oscillator 14 is configured to be started upon detection of the ON cause detection signal sent from the ON cause detector 13, and then to send timing signals to be the respective reference timings for the portable electronic device. Reference symbol (c) of FIG. 4 shows timings of the respective occurrences of the timing signals (clock signals).

The starting controller 15 is configured to be started upon detection of an insertion of the AC adapter, and then to start the regulators 12#1 to 12#n respectively at predetermined timings.

To be more precise, the starting controller 15 is configured to be started upon detection of the adapter detection signal, and then to send regulator control signals #1 to #n respectively to the regulators 12#1 to 12#n at predetermined timings based on a predetermined starting sequence. Reference symbols (d) to (f) of FIG. 4 respectively show timings of occurrences of the regulator control signals #1 to #n.

In addition, the starting controller 15 is configured to send a reset signal to the CPU 1 after predetermined time elapses from the starting of the regulator 12#1. In the example of FIG. 3, the regulator 12#1 is configured to start the CPU 1 by using an starting signal.

Reference symbol (g) of FIG. 4 shows a timing of an occurrence of such a reset signal. In an example of (g) of FIG. 4, the starting controller 15 is configured to send the reset signal to the CPU 1 after t, seconds elapses after the time of sending the regulator control signal #1 for starting the regulator 12#1.

The regulators 12#1 to 12#n are configured to be started respectively with detections of the regulator control signals #1 to #n.

The CPU 1 is configured to be started upon detection of the above-described starting signal, and then to send a charging-control signal in response to the reset signal and the adapter detection signal.

Here, the CPU 1 is configured to operate by using a regulator voltage $V_{REG}$ which is an output voltage of the regulator 12#1.

To be more precise, the CPU 1 is configured to be started after reset release in response to the reset signal sent from the starting controller 15, and that thereafter the CPU 1 controls the charging to be described below. A charging control by the CPU 1 is briefly described below.

A comparator A provided to the battery charging control LSI reads a potential difference between both ends of a resistance R, and then converts the potential difference into a charging current value which indicates a charging current flowing to the battery 2. Thereafter the comparator A informs the CPU 1 of the charging current value.

The charging current value is converted into digital values by an A/D converter 22 of the CPU 1. Thereafter, the converted values are inputted to a software processor 21.

On the other hand, since the battery voltage $V_{BAT}$ is higher than an operation voltage of the CPU 1, a buffer B provided to the battery charging control LSI multiplies the battery voltage $V_{BAT}$ by a gain so that the battery voltage $V_{BAT}$ is reduced to be equivalent to the operation voltage of the CPU 1, and then informs the CPU 1 of the reduction.

The battery voltage value reduced down to the operation voltage of the CPU 1 is converted into digital values by an A/D converter 23 of the CPU 1. Then, the converted values are inputted into the software processor 21 of the CPU 1.

The software processor 21 of the CPU 1 controls the charging by creating and sending the charging-control signal (a command) to the charging circuit 11 on the bases of the charging current value and the battery voltage value which are inputted as described above.

For example, when the battery voltage is lower than a predetermined threshold, the software processor 21 of the CPU 1 increases a charging current. In a case where the battery voltage is higher than the predetermined threshold, close to a full-charge voltage, and where a charging current is lower than a predetermined threshold, the software processor 21 stops performing the charging control.

A method of performing the charging control by the CPU 1 is not limited to the above-described method, and another method may be used. Incidentally, the charging circuit 11 is configured to operate by using the AC adapter voltage $V_{AC}$. The regulators 12#1 to 12#n, the ON cause detector 13, the oscillator 14 and the starting controller 15 operate by using the battery voltage $V_{BAT}$.

However, the regulators 12#1 to 12#n, the ON cause detector 13, the oscillator 14 and the starting controller 15 are configured not to operate unless the AC adapter is inserted, even in a case where the battery 2 is inserted.

As described above, the charging circuit 11 may be provided inside the battery charging control LSI, or may be provided outside thereof.

(Operations of Portable Electronic Device)

Next, by referring to FIG. 5, descriptions will be provided below for operations for controlling battery charging in the portable electronic device according to the present embodiment. Here, it is supposed that a battery 2 has been inserted into the portable electronic device. However, unlike a conventional battery charging control LSI, the CPU 1 and the regulators 12#1 to 12#n have not been started.

Figure 5:
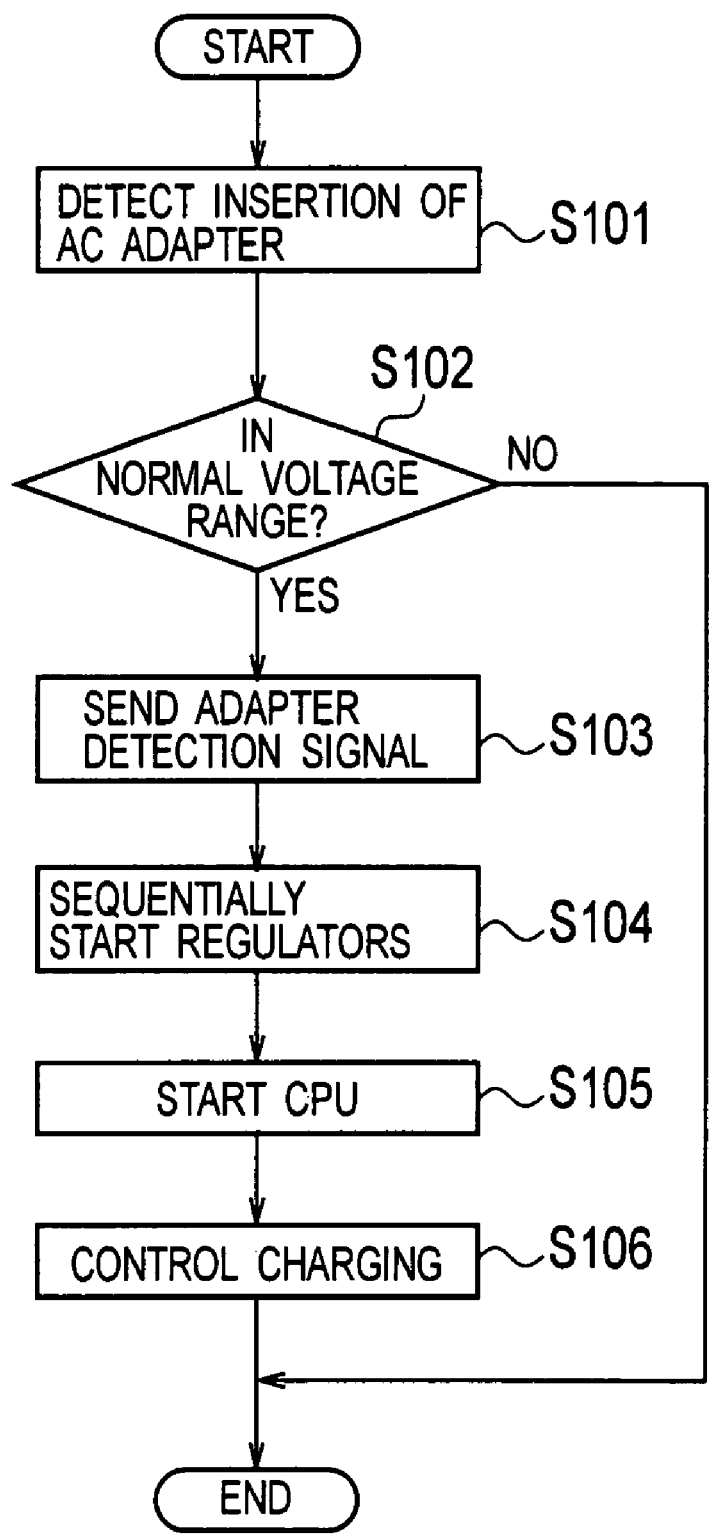
FIG. 5 is a flowchart showing operations for controlling battery charging in the portable electronic device provided with a battery charging control LSI according to an embodiment of the present invention.

As shown in FIG. 5, in Step S101, the charging circuit 11 detects an application of an AC adapter voltage $V_{AC}$, i.e., detects an insertion of the AC adapter.

In Step S102, the charging circuit 11 determines whether or not an applied AC adapter voltage $V_{AC}$ is in a normal voltage range.

When a result of the determination is positive, the operation proceeds to Step S103. When a result of the determination is negative, the operation is terminated.

In Step S103, the charging circuit 11 sends an adapter detection signal to each of the CPU 1, the ON cause detector 13 and the starting controller 15. Incidentally, at this time, the CPU 1 has not been started.

Subsequently, the ON cause detector 13 sends an ON cause detection signal to the oscillator 14 in response to the received adapter detection signal. Then, the oscillator 14 sends timing signals to the starting controller 15 in response to the received ON cause detection signal.

In Step S104, the starting controller 15 sends the regulator control signals #1 to #n in response to the received adapter detection signal and the timing signals, and thereby sequentially starts the regulators 12#1 to 12#n.

In Step S105, the regulator 12#1 starts the CPU 1 by using an starting signal.

In Step S106, CPU 1 is started upon detection of the starting signal sent from the regulator 12#1, and then generates the above-described charging-control signal in response to the adapter detection signal sent from the charging circuit 11 and to the reset signal sent from the starting controller 15. Thereafter, the CPU 1 sends the generated signal to the charging circuit 11.

Thereafter, in response to the charging-control signal received from the CPU 1, the charging circuit 11 performs an ON/OFF control of a pMOS transistor switch so that control for charging the battery 2 is performed.

(Operation and Effect of Portable Electronic Device)

According to the portable electronic device according to the present embodiment, the regulators 12#1 to 12#n are configured not to be started in a case where insertion of a battery 2 is detected, and to be sequentially started after insertion of an AC adapter is detected. Thus, the duration of the battery 2 can be extended by saving power consumption of the battery 2.

According to the portable electronic device according to the present embodiment, the starting controller 15 is configured to send a reset signal to the CPU 1 after the predetermined time $t_r$ elapses from the starting of the regulator 12#1. Hence, it is possible to avoid a situation where a reset signal is sent to the CPU 1 before properly completing the starting of the CPU 1.

As described above, the present invention has been described in detail by using the above-described embodiment. However, it is obvious to those skilled in the art that the present invention is not limited to the description and the drawings of the above-described embodiment. In the present invention, changes and modifications may be made without departing from the scope and the spirit of the present invention, defined by the appended claims. Accordingly, the present embodiment is to be considered in all respects as illustrative and not restrictive of the present invention.

What is claimed is:

1. A battery charging controller configured to control a charging of a battery, the battery charging controller comprising:

a charging circuit configured to detect an insertion for an alternating current adapter, and then to output an adapter detection signal;

an ON cause detector configured to receive the adapter detection signal, and then to output an ON cause detection signal indicating that the alternating current adapter is inserted;

an oscillator configured to be started by a detection of the ON cause detection signal, and then to send a timing signal;

a starting controller configured to be started by the adapter detection signal, and then to send a regulator control signal for starting a regulator in accordance with the adapter detection signal and the timing signal, and to output a reset signal after a predetermined time elapses from a point in time at which the regulator control signal is sent; and a central processing unit configured to be started by a signal outputted from the regulator, and then to generate a charging-control signal for the battery charging in accordance with the adapter detection signal and the timing signal, and then to output the charging-control signal to the charging circuit.

2. The battery charging controller according to claim 1, wherein the regulator is a plurality of regulators, and
the plurality of regulators are started sequentially by the regulator control signal.

3. A portable electronic device comprising:
a battery charging controller according to claim 2; and
a battery configured to be charged by the battery charging controller.

4. A portable electronic device comprising:
a battery charging controller according to claim 1; and
a battery configured to be charged by the battery charging controller.

5. The battery charging controller according to claim 1, further comprising:
a switch having an end to which a voltage from the alternating current adapter is applied;
a resistance having an end connected to another end of the switch, and another end connected to the battery; and
a comparator configured to output a signal corresponding to a difference between voltages of each end of the resistance, wherein
the central processing unit is configured to generate the charging-control signal in accordance with the signal outputted from the comparator, and then to output the charging-control signal to the charging circuit, and
the charging circuit is configured to control ON and OFF states of the switch on the basis of the charging-control signal.

6. A portable electronic device comprising:
a battery charging controller according to claim 5; and
a battery configured to be charged by the battery charging controller.

7. The batter charging controller according to claim 5, further comprising a first analog/digital converter configured to convert the signal outputted from the comparator into a digital value, wherein
the central processing unit is configured to generate the charging-control signal in accordance with the digital value outputted from the first analog/digital converter, and then to output the charging-control signal to the charging circuit.

8. A portable electronic device comprising:
a battery charging controller according to claim 7; and
a battery configured to be charged by the battery charging controller.

9. The batter charging controller according to claim 7, further comprising:
a buffer configured to convert a voltage of the battery into an operation voltage for the central processing unit;
a second analog/digital converter configured to convert an output of the buffer into a digital value, wherein
the central processing unit is configured to generate the charging-control signal in accordance with the digital values outputted from the first analog/digital converter and the second analog/digital converter, and then to output the charging-control signal to the charging circuit.

10. A portable electronic device comprising:
a battery charging controller according to claim 9; and
a battery configured to be charged by the battery charging controller.

11. The batter charging controller according to claim 9, wherein the central processing unit comprises a software processor configured to receive the digital values outputted from the first analog/digital converter and the second analog/digital converter, wherein
the software processor is configured:
to increase charging electric-current to the battery in a case where a voltage of the battery is lower than a predetermined threshold voltage, and
to stop charging to the battery in a case where a voltage of the battery is higher than the predetermined threshold voltage and the charging electric-current is lower than a predetermined threshold electric-current.

12. A portable electronic device comprising:
a battery charging controller according to claim 11; and
a battery configured to be charged by the battery charging controller.

* * * * *